UNITED STATES PATENT OFFICE.

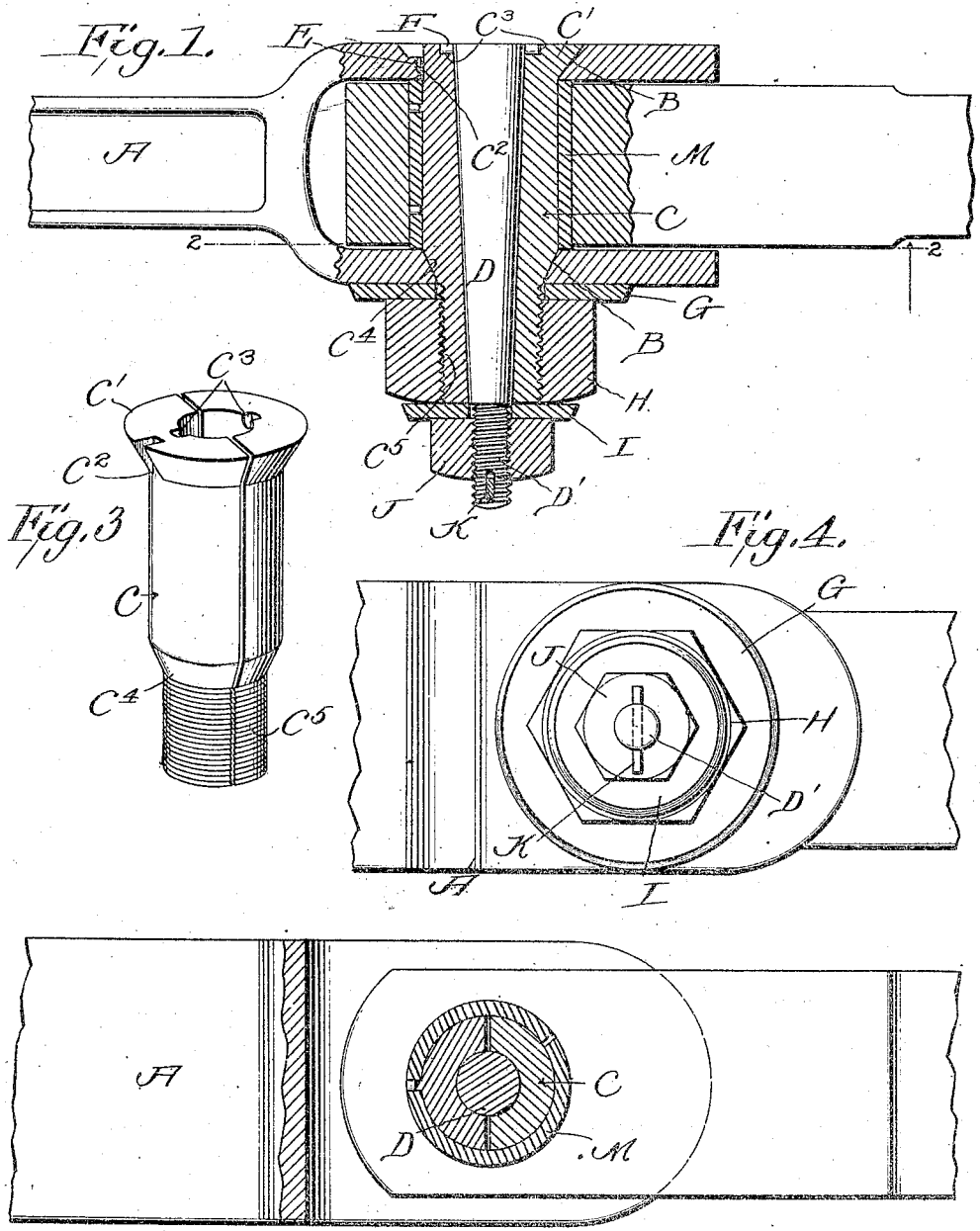

JOHN G. ANDREGG, OF LORAIN, OHIO.

PIN FOR CROSS-HEADS OR CLEVISES.

1,011,398.  Specification of Letters Patent.  Patented Dec. 12, 1911.

Application filed April 20, 1911. Serial No. 622,310.

*To all whom it may concern:*

Be it known that I, JOHN G. ANDREGG, a citizen of the United States, residing at Lorain, in the county of Lorain and State of Ohio, have invented a new and useful Improvement in Pins for Cross-Heads or Clevises, of which the following is a specification.

This invention relates to certain new and useful improvements in cross head or clevis pins for locomotives, the object being to improve the general construction of such pins, whereby the life of the same will be greatly increased.

Another object of my invention is to provide a pin which is so constructed that the wear of the same can be taken up in order to prevent the pin from working loose.

Another object of my invention is to provide a pin which is exceedingly simple and cheap in construction, and one in which the parts are so connected that all danger of the pin becoming detached from the cross head or clevis when in use is prevented.

A still further object of my invention is to provide a pin which is formed of two sections having a tapering bore through which extends a tapering bolt for expanding said sections.

With these objects in view, the invention consists in the novel features of construction, combination and arrangement of parts hereinafter fully described and pointed out in the claims:

In the drawing forming a part of this specification:—Figure 1 is a horizontal section through my improved clevis pin showing the application of the same. Fig. 2 is a vertical section taken on line 2—2 of Fig. 1. Fig. 3 is a perspective view of the pin detached. Fig. 4 is a top plan view.

In carrying out my improved invention, I employ a clevis A which is provided with oppositely disposed openings having beveled walls as shown at B, through which extends a pin C which is formed of two sections as clearly shown, and is provided with a tapering bore through which extends a tapering bolt D. The pin formed by the sections is provided with a conical head C' having a groove $C^2$ into which extends a pin E carried by the clevis for preventing the pin from turning within the same, and said sections are also provided with notches $C^3$ into which extend oppositely disposed lugs $F$ formed on the end of the bolt D, whereby said bolt will also be prevented from turning within the pin. The pin C is provided with a conical portion $C^4$ co-acting with the beveled wall of the bore of the clevis, and terminating in a threaded portion $C^5$ over which is arranged a washer G which is secured in position by a nut H for locking the same firmly. The bolt D is of a greater length than the bolt C and is provided with a threaded end D' over which is arranged a washer I which is forced against the nut H by a nut J, said nut being locked by a pin K extending through a transverse bore formed in the end of the bolt as clearly shown. By securing the pin within the clevis in this manner it is securely held, and in such a manner that the sections can be forced apart by tightening the nut J on the bolt.

In use the bushing M is placed over the pin between the arms of the clevis which is preferably formed of steel in order to increase the life of the pin, and is adapted to receive the bearing.

What I claim is:—

1. A clevis pin formed of two sections having a tapering bore and provided with a threaded portion, a tapering bolt extending through said tapering bore provided with a threaded end, a nut carried by the threaded portion of said pin, and a nut carried by the threaded portion of said bolt for locking said pin and nut in position.

2. A clevis pin longitudinally divided into two sections, having an interior notch, and the lower portion of the pin being exteriorly threaded, of a bolt of greater length than the pin and adapted to extend therethrough, said bolt having lugs adapted to engage said notches, and having a projecting threaded portion, a nut adapted to work upon the threaded portion of the pin, a washer adapted to fit over the bolt and bear upon the pin, and a second nut adapted to work upon the threaded portion of the bolt and bear upon said washer.

JOHN G. ANDREGG.

Witnesses:
C. M. IRISH,
H. B. GATCHELL.